United States Patent [19]
Takagi et al.

[11] Patent Number: 4,868,960
[45] Date of Patent: Sep. 26, 1989

[54] TRANSFER MACHINE

[75] Inventors: Masayoshi Takagi, Kariya; Yashuhiro Okada, Nagoya, both of Japan

[73] Assignee: Toyoda Koki Kabushiki Kaisha, Kariya, Japan

[21] Appl. No.: 308,453

[22] Filed: Feb. 10, 1989

[30] Foreign Application Priority Data

Feb. 12, 1988 [JP] Japan ............................. 63-17699[U]

[51] Int. Cl.$^4$ ...................... B23Q 39/04; B65G 47/00
[52] U.S. Cl. ....................................... 29/33 P; 29/563
[58] Field of Search ...................... 29/33 P, 563, 564; 409/158, 159, 172, 221, 174; 198/344, 345, 346.1, 774, 775; 414/917

[56] References Cited

U.S. PATENT DOCUMENTS 3,010,371 11/1961 Riedel et al. ...................... 408/53
4,394,897 7/1983 Brems ................................ 198/345
4,603,456 8/1986 Hiroyasu et al. .................. 29/563

FOREIGN PATENT DOCUMENTS 31530 3/1980 Japan .................................. 29/563
161810 8/1985 Japan .................................. 198/774
1288132 2/1987 U.S.S.R. ........................... 198/774

Primary Examiner—Gil Weidenfeld
Assistant Examiner—Daniel W. Howell
Attorney, Agent, or Firm—Oblon, Spivak, McClelland, Maier & Neustadt

[57] ABSTRACT

In a transfer machine of the type that workpieces are transferred to a plurality of machining stations one after another by reciprocatively moving a horizontally extending transfer bar in a vertical direction and a longitudinal direction thereof, a plurality of transfer turn tables for holding the workpieces are arranged on the transfer bar in a serial fashion and are rotatably carried thereon each for rotatable about a vertical axis. A guided member bodily rotatable with each of the turn tables is formed with a guided groove, which is maintained engaged with a fixed guiding rail during the axial feed movement of the transfer bar, but is engaged with a turn drive claw only at at least one machining station where the angular position of the turn table has to be changed. The drive claw is rotatably carried at the at least one machining station in alignment with the guiding rail and is drivingly connected with a turn drive motor so as to change the angular position of the turn table at the at least one machining station.

6 Claims, 2 Drawing Sheets

TRANSFER MACHINE

BACKGROUND OF THE INVENTION

1. Field of the Invention:

The present invention relates to a transfer machine of the type wherein a transfer bar is reciprocatively moved in a vertical direction and its longitudinal horizontal direction to transfer workpieces carried thereon to a plurality of machining stations one after another.

2. Discussion of the Prior Art:

Known transfer machines include those of a so-called "lift and carry" type wherein a transfer bar which extends in the transfer direction of workpieces performs a series of rise, advance, down and retraction movements so as to transfer workpieces intermittently. A known transfer machine of this type is designed to transfer each workpiece from one machining station to the next, with the workpiece being carried on the transfer bar, and thus, the angular position or posture of each workpiece cannot be changed on the transfer bar.

However, it may be the case that the change in the angular position of the workpiece is required in adaptation for the kind of the workpiece to be machined, the arrangement of a machining unit relative to the workpiece and so forth. In such a case, it has been a practice to provide between two machining stations a position change station having a turn table which is rotatable over a transfer bar within a horizontal plane and to change the angular position of the workpiece by rotating the turn table. Therefore, the known transfer machine so designed gives rise to problems in that such a position change station wherein no machining operation is performed has to be additionally provided, thereby elongating the entire length thereof.

SUMMARY OF THE INVENTION

Accordingly, it is a primary object of the present invention to provide an improved transfer machine which does not require any intermediate or non-machining station dedicated only to position change of workpieces to be transferred and machined and in which such position change of the workpieces can be reliably realized.

Another object of the present invention is to provide an improved transfer machine of the character set forth above wherein each workpiece can be reliably maintained at a fixed angular phase during transfer feed between machining stations and wherein a single drive motor at a machining station can serve to change the positions of the workpieces successively transferred to the machining station.

Briefly, in a transfer machine according to the present invention, a plurality of transfer turn tables are arranged on a horizontally reciprocatable transfer bar in a serial fashion for transferring workpieces carried thereon to machining stations one after another and are each rotatable about an axis perpendicular to the longitudinal axis of the transfer bar. A guided member provided on the lower end of each turn table is formed with a guided groove which extends in the same horizontal direction as the transfer bar to be guided by a guiding rail during transfer motion between the machining stations and by a turn drive member at least one machining station of the machining stations where the angular position of each workpiece has to be changed. A turn drive mechanism is further provided at the at least one machining station for rotating the turn drive member engaged with the guided member of the turn table transferred to the at least one machining station.

With this configuration, since each turn table is brought into driving connection with the turn drive member only at the at least one machining station, the angular position of the workpiece of the turn table at the at least one machining station can be changed to a desired angular position. Therefore, it is unnecessary to provide an intermediate or non-machining station between the at least one machining station and another machining station located downstream thereof with respect to the workpiece transfer direction, thereby avoiding that the transfer machine becomes longer. Moreover, the angular position of each turn table is kept unchanged because of its associated guided member being engaged with the guiding rail. This advantageously results in avoiding the generation of vibration which may be caused where the workpieces are transferred with different or unfixed angular positions thereof, and hence, in a high speed transfer of the workpieces.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment, wherein like reference numerals designate identical or corresponding parts throughout the several views, and in which.

DETAILED DESCRIPTION OF THE PREFERRED EMBODIMENT

Figure 1:
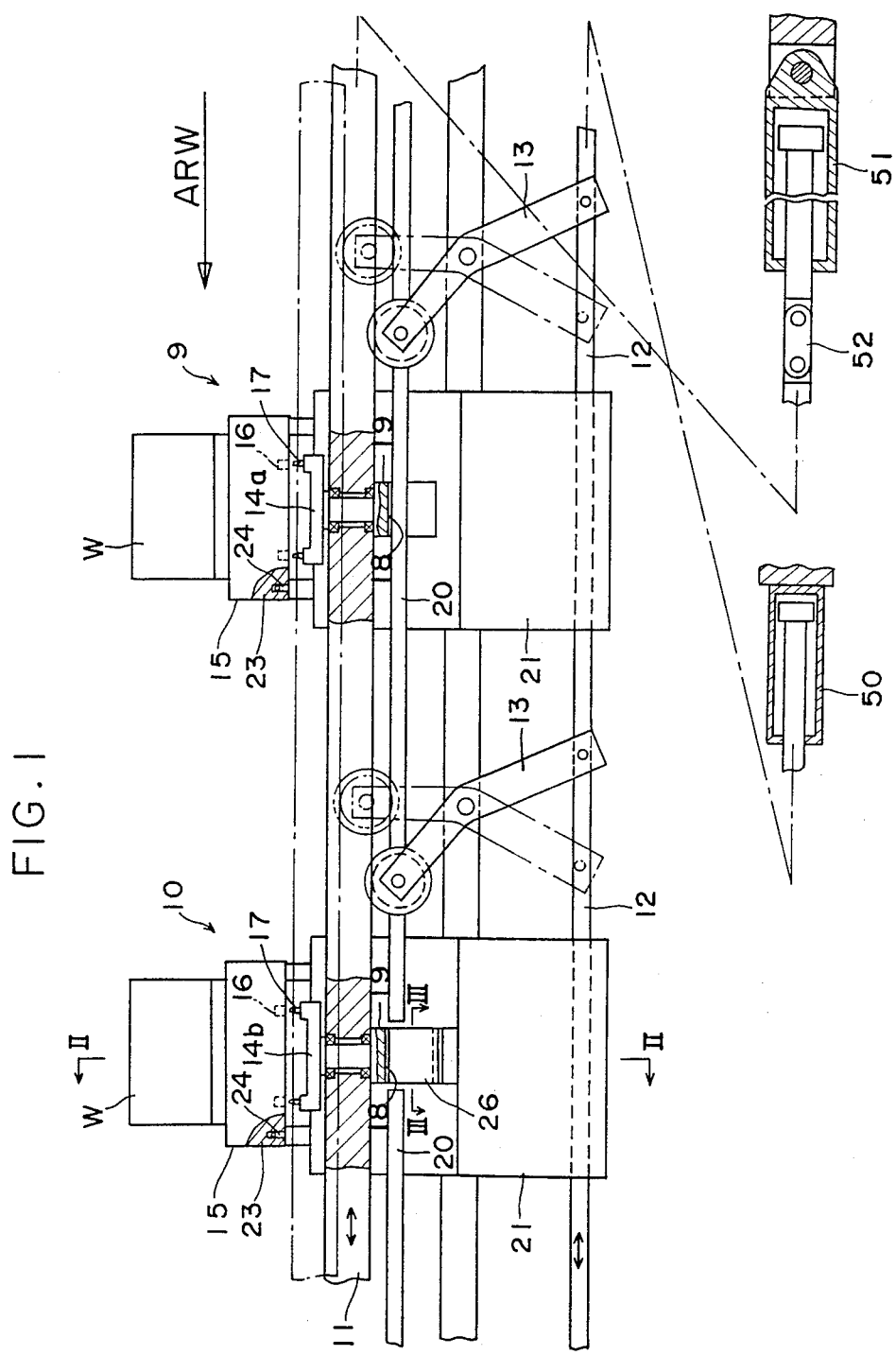
FIG. 1 is an elevational view, partly in section, of a transfer machine according to the present invention.

Referring now to the drawings and particularly to FIG. 1 thereof, numerals 9 and 10 denote machining stations, and a numeral 11 denotes a transfer bar which loads workpieces W onto, and unloads the same from, the machining stations 9, 10 one after another. The transfer bar 11 is of the configuration wherein it is raised and lowered by the reciprocation of an actuation rod 12 connected to a fixed cylinder 50 and wherein it is advanced and retracted by the reciprocation of a transfer cylinder 51 pivotably connected to one end of the transfer bar 11 through a link 52. The transfer cylinder 51 is also pivotably connected to a frame (not numbered) of the machine. The transfer bar 11 carries thereon transfer supports or turn tables 14a and 14b each of which is rotatable through a pair of bearings (not numbered) within a horizontal plane. Each transfer turn table 14a or 14b protrudes from the top a set of holding pins 17, which are able to fit in mating holding holes 16 opening at the lower surface of each of the workpiece pallets 15. The workpieces W to be machined are respectively mounted on the workpiece pallets 15 and fixed thereon by means of suitable clamping mechanisms (not shown) associated therewith.

Figure 2:
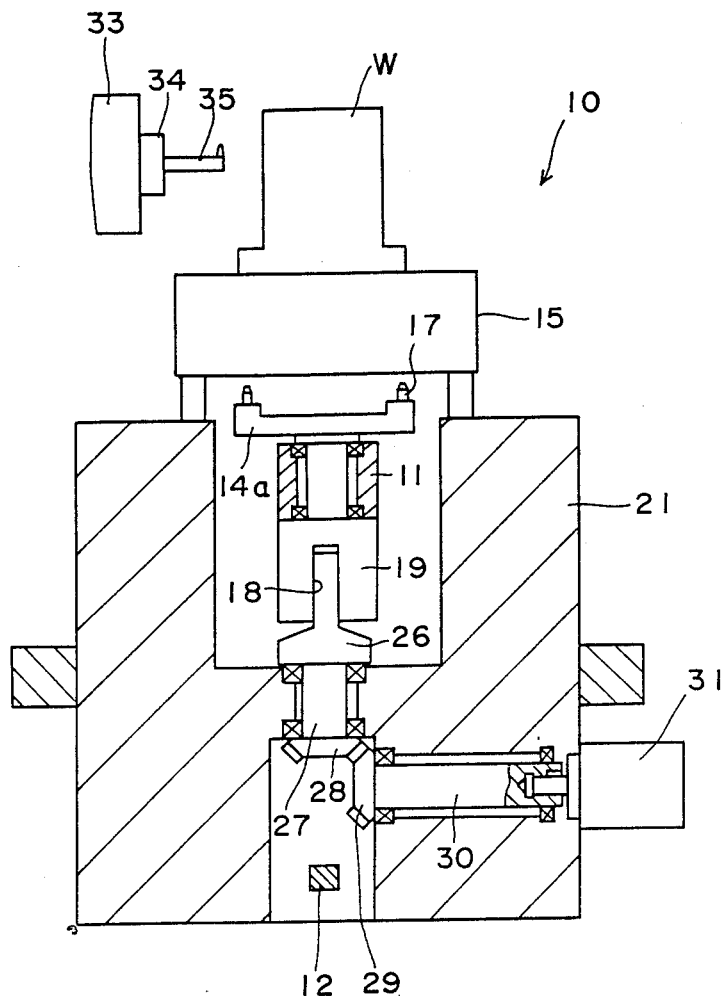
FIG. 2 is a cross-sectional view of the machine, taken along the line II—II in FIG. 1.
Figure 3:
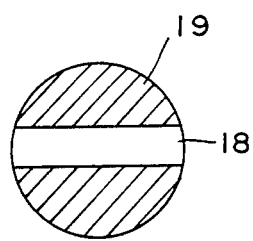
FIG. 3 is a cross-sectional view of a guided member rotatable bodily with a transfer turn table associated therewith.

As also shown in FIG. 2, a guided member 19 is secured to each of the transfer turn tables 14a, 14b under the transfer bar 11 and is formed with a guided groove 18 which extends in the lengthwise or longitudinal direction of the transfer bar 11, as best shown in FIG. 3. The guided groove 18 of each guided member 19 is selectively engaged with any one of guiding rails 20 during the transfer motion and with a turn drive claw 26 of a turning device which will be referred to later in detail. It is to be noted that the guiding rails 20 are secured to bases 21 of the machining stations 9, 10 through brackets (not shown) at such a position as to extend in parallel relation with the transfer bar 11.

Each of the machining stations 9, 10 is constituted by the machining base 21 and a machining unit 33. The machining unit 33 is movable in a direction perpendicular to the longitudinal direction of the transfer bar 11 and carries a tool spindle 34 rotatable about a horizontal axis. A cutting tool 35 such as, for example, a boring tool is attached to the distal end of the tool spindle 34. Each of the machining bases 21 protrudes from the top a set of locating pins 24 which are respectively fittable in mating locating holes 23 opening at the lower surface of each pallet 15. The machining base 21 of the machining station 10 provides therein the turn drive claw 26 which has such a vertical length as to keep the engagement with the guided groove 18 even when the transfer bar 11 is at a raised position. The turn drive claw 26 is secured to an upper end of a vertical rotary shaft 27, which is rotatably carried in the machining base 21. A horizontal drive shaft 30 also carried in the machining base 21 of the station 10 is in driving connection with the vertical rotary shaft 27 through a pair of bevel gears 28, 29 for transmitting to the claw 26 a driving power from a drive motor 31 attached to the lateral surface of the machining base 21.

Operation of the apparatus as constructed above will be described hereinafter.

When the transfer bar 11 is raised upon operation of the cylinder 50, each of the pallets 15 at the machining stations 9, 10 is carried on the transfer turn table 14a or 14b at the same station, with their holding pins 17 being fitted respectively in the set of holding holes 16 thereof. The transfer bar 11 is then advanced upon operation of the cylinder 51 one transfer pitch to transfer each of the pallets 15 right over the next machining station (although only two machining stations 9, 10 are illustrated herein for the sake of brevity), as indicated by the arrow ARW in FIG. 1.

During the advance feed motion, the transfer bar 11 is maintained at the raised position, and the guided groove 18 of the guided member 19 which is prevented by the guiding rail 20 from angularly moving comes into engagement with the turn drive claw 26 at the end of such advance motion of the transfer bar 11. With the guided groove 18 being engaged with the turn drive claw 20, the drive motor 31 is rotated a predetermined angle to turn the transfer turn table 14a now at the machining station 10 to a predetermined angle, whereby the angular position of the workpiece W transferred to the machining station 10 is changed to locate the set of the locating holes 23 respectively right over, and in alignment with, the set of the locating pins 24 on the machining base 21 of the station 10. Where a further or third machining station (not shown) is of the same configuration as the first station 9, the guided member 19 of the turn table 14b now at the third machining station remains engaged with the guiding rail 20. On the contrary, where the third machining station is of the same configuration as the second station 10, the angular position of the transfer turn table 14b now at the third machining station is changed in substantially the same manner as described above with regard to the transfer turn table 14a now at the second machining station 10.

Subsequently, as the transfer bar 11 is lowered, the locating holes 23 of the pallet 15 now at the station 10 are brought into fitting engagement with the mating locating pins 24. In this manner, each of the pallets 15 is thus precisely positioned and then, is clamped on the machining base 21 by means of a suitable clamping mechanism (not shown), whereafter the machining units 33 are advanced to initiate the machining operations on the workpieces W. At the same time, the holding pins 17 of each transfer turn table 14a, 14b are disengaged from the holding holes 16 of each pallet 15, and when the transfer bar 11 reaches the lower position thereof, the turn drive motor 31 of the machining station 10 is reversely operated the predetermined angle to bring the guided groove 18 of the guided member 19 for the turn table 14a into alignment with the guiding rail 20. The transfer bar 11 is then retracted one transfer pitch to return the transfer turn tables 14a, 14b respectively to the machining stations 9 and 10. When the transfer bar 11 is returned to the original position thereof, the turn table 14b brings the guided groove 18 of the associated guided member 19 into engagement with the turn drive claw 26 at the station 10. The turn drive motor 31 is again rotated the predetermined angle to bring the holding pins 17 of the turn table 14b now at the station 10 into alignments respectively with the holding holes 16 of the pallet 15. A waiting is thereafter made for the completion of the machining operations.

Upon completion of the machining operations at all of the machining stations 9 and 10, the transfer bar 11 is raised to bring the holding pins 17 of the turn tables 14a, 14b into engagements with the holding holes 16 of the pallets 15. The turn drive motor 31 at the station 10 is then reversely rotated the predetermined angle to align the guided groove 18 for the turn table 14b with the fixed guiding rail 20, whereby the workpieces W on the turn tables 14a, 14b are transferred respectively onto the machining station 10 and the third machining station (not shown) by the subsequent advance and down motions of the transfer bar 11.

Figure 4:
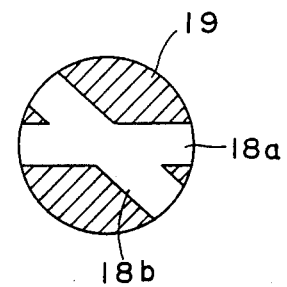
FIG. 4 is a cross-sectional view showing a modified form of the guided member and corresponding to the view of FIG. 3.

It is to be noted that although the guided member 19 is formed with the single guided groove 18 best shown in FIG. 3 in the aforementioned embodiment, the present invention is not limited to the guided member 19 of such configuration. In a modified form of the present invention, the guided member 19 may be formed with two guided grooves 18a, 18b which differ in angular phase, as shown in FIG. 4, so that each workpiece W can take two different angular positions respectively when loaded onto, unloaded from, the machining station 10.

Obviously, numerous modifications and variations of the present invention are possible in light of the above teachings. It is therefore to be understood that within the scope of the appended claims, the present invention may be practiced otherwise than as specifically described herein.

What is claimed is:

1. A transfer machine of the type wherein workpieces are transferred to a plurality of machining stations one after another by reciprocatively moving a horizontally extending transfer bar having a longitudinal axis in a first direction perpendicular longitudinal axis of said transfer bar and in a second direction coinciding with said longitudinal axis, said transfer machine comprising:

a plurality of transfer turn tables rotatably carried on said transfer bar in a serial fashion for respectively mounting said workpieces thereon;

a plurality of guided members respectively rotatable bodily with said transfer turn tables and each formed with a guided groove;

a turn drive member rotatably carried at at least one of said machining stations and snugly engageable with any of said guided grooves of said guided members when said guided member with said guided groove is transferred together with one of said transfer turn tables to said at least one machining station; and a drive motor drivingly connected with said turn drive member for rotating the same so as to change the angular position of said workpiece transferred to said at least one machining station.

2. A transfer machine as set forth in claim 1, further comprising:

guiding means fixedly provided in parallel relation with said transfer bar and engageable with said guided grooves of said guided members for maintaining said transfer turn tables at a predetermined angular position except for at said at least one machining station, with said guided member thereof being in engagement at said guided groove with said turn drive member.

3. A transfer machine comprising:

a transfer bar horizontally extending in a first direction;

bar drive means for reciprocatively moving said transfer bar in said first direction and in a second direction perpendicular thereto;

a plurality of transfer turn tables arranged in a serial fashion on said transfer bar and each rotatable about an axis extending in said second direction;

a plurality of machining stations arranged along said transfer bar;

a plurality of guided members bodily rotatable with said transfer turn tables respectively and each formed with guided groove means;

a turn drive member carried at at least one of said machining stations for rotation about an axis extending in said second direction and engageable with said guided groove means of any of said guided members which is at said at least one machining station;

guiding bar means fixedly provided in parallel relation with said transfer bar and engageable with said guided groove means of said guided members except for at least one guided member which is at said at least one machining station, for maintaining at a predetermined angular position said transfer turn tables which are at other than said at least one machining station; and a turn drive motor drivingly connected with said turn drive member for rotating the same so as to change the angular position of any of said transfer turn tables which is at said at least one machining station.

4. A transfer machine as set forth in claim 3, wherein: said second direction is a vertical direction.

5. A transfer machine as set forth in claim 4, further comprising:

a set of holding pins protruding from the top of each of said transfer turn tables;

a set of locating pins protruding from the top of each of said machining stations; and a plurality of pallets designed to mount said workpieces thereon and each formed at a lower surface thereof with a set of holding holes to which said set of holding pins are snugly fittable and with a set of locating holes to which said set of locating pins are snugly fittable.

6. A transfer machine as set forth in claim 3, wherein said groove means of each of said transfer turn tables includes:

first and second grooves which extend in first and second directions perpendicular to the rotational axis of said transfer turn table associated therewith at different angular phases for selective engagement with any of said guiding bar means and said turn drive member.

* * * * *